Figure 1:
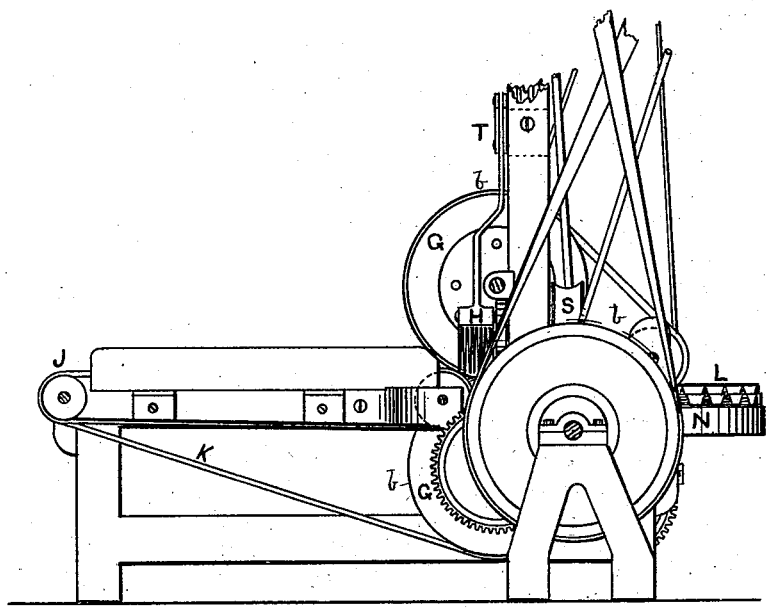

2 Sheets—Sheet 1.

G. WILLETT.
TAMPICO COMBING AND DRESSING MACHINE.

No. 184,943. Patented Nov. 28, 1876.

WITNESSES.  
Edward C. Ryer  
R. S. Taft

INVENTOR.  
George Willett

2 Sheets—Sheet 2.
G. WILLETT.
TAMPICO COMBING AND DRESSING MACHINE.
No. 184,943. Patented Nov. 28, 1876.
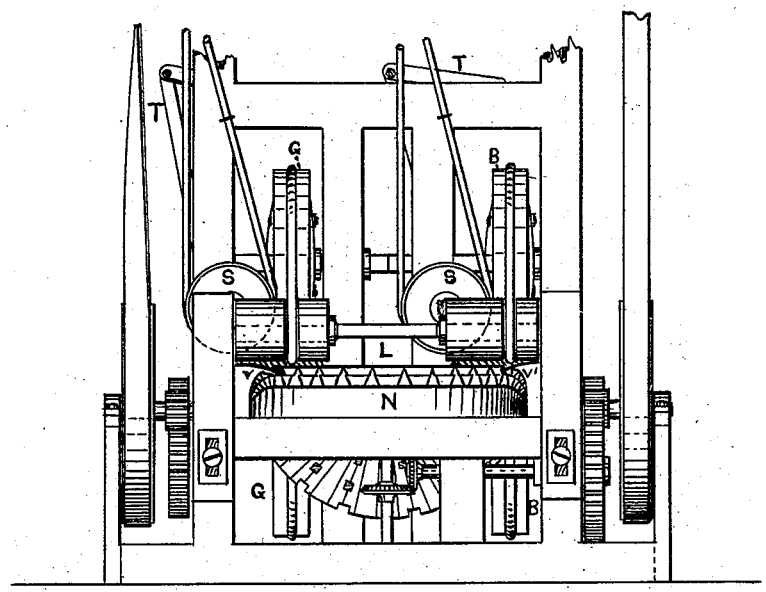
FIG. 3.
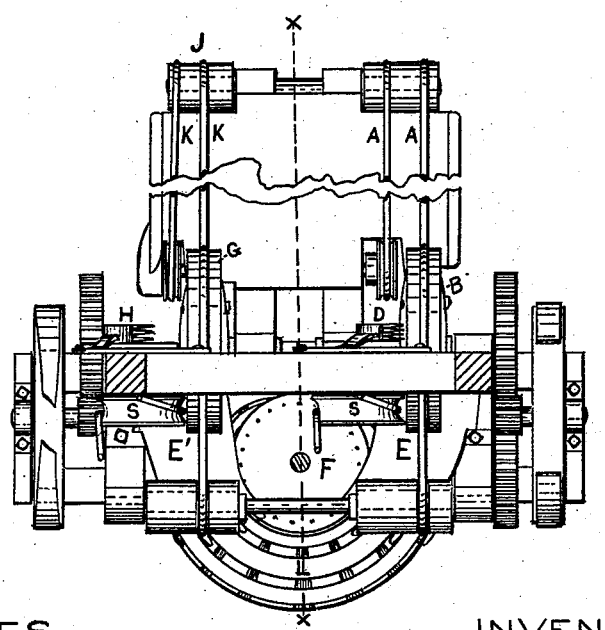
WITNESSES. FIG. 4. INVENTOR.

UNITED STATES PATENT OFFICE.

GEORGE WILLETT, OF BURLINGTON, ASSIGNOR TO ENOCH B. WHITING, OF ST. ALBANS, VERMONT.

IMPROVEMENT IN TAMPICO COMBING AND DRESSING MACHINES.

Specification forming part of Letters Patent No. 184,943, dated November 28, 1876; application filed June 16, 1874.

*To all whom it may concern:*

Be it known that I, GEORGE WILLETT, of Burlington, county of Chittenden, State of Vermont, have invented an Improvement in Machines for Combing Tampico and Bristles, of which the following is a specification:

This invention relates to a class of machines which are used for the preparation of stock (tampico and bristles) used in the manufacture of brushes.

Machines of this class are not entirely new, one instance being the subject-matter of Letters Patent numbered 142,427, granted to myself under date September 2, 1873.

The object of my improvement is to simplify the former machine, and render it more effective in its operation, and which object I accomplish in dispensing with a number of complicated friction-belts, chains, and pulleys heretofore used, and substituting therefor simple and more direct-acting mechanism.

In my machine there is a series of rotating friction bristle-holders, usually four of them, placed in sets of two, one above the other in each set, the surfaces of which are flexible. The peripheries of the holders, in each set, are placed close enough together to force their flexible faces to form flat friction - surfaces, about six inches long by the width of the face of the holders, to which flat surfaces the stock (tampico and bristles cut to a proper length, say five to ten inches) is carried from a feeding - point, by endless belts or cords, and so presented to and passed between the holders aforesaid that half its length projects therefrom to be acted upon by a broad metallic comb, making about two hundred strokes per minute, which mixes and cleans the stock, the holders rotating at a speed of about twelve feet per minute.

I use in connection with two or more sets of these friction bristle-holders and combs, a sectional transferring and reversing endless carrier-belt, operated by a horizontal driving-disk, or other suitable device, and running in a circular raceway. Two polished plates form connection between the said sectional carrier-belt and the friction bristle-holders, the plates having over them one or more pressure-bands, so arranged that the "stock," after passing between the first set of holders, one-half of the length of the stock being combed in its passage, is passed onto one of the polished plates, being kept in position—that is, from breaking up—by the band above, and moved by said band and the pressure of the stock behind coming from the holders to the sectional reversing-belt, which latter transfers the stock or bristle to a second polisher-plate on the other side of the machine, turning the stock end for end in the operation, from which second plate it, the stock, passes to a second set of friction bristle holders and comb, one-half of the stock projecting from this second set of holders, as in the first instance, where it is completed by this second comb, and moved to the end of the machine it started from, over a set of endless belts or cords, similar to those that carried it (the stock) from the feeding-point to the first set of friction bristle-holders.

The stock is laid on the endless feeding-belts by hand, a little in advance of the friction-holders, first being as evenly mixed as possible, and is run through the machine as many times as is necessary to completely dress and mix it. Once passing through is, generally speaking, enough to completely straighten the stock, although not enough to fully dress it.

Figure 2:
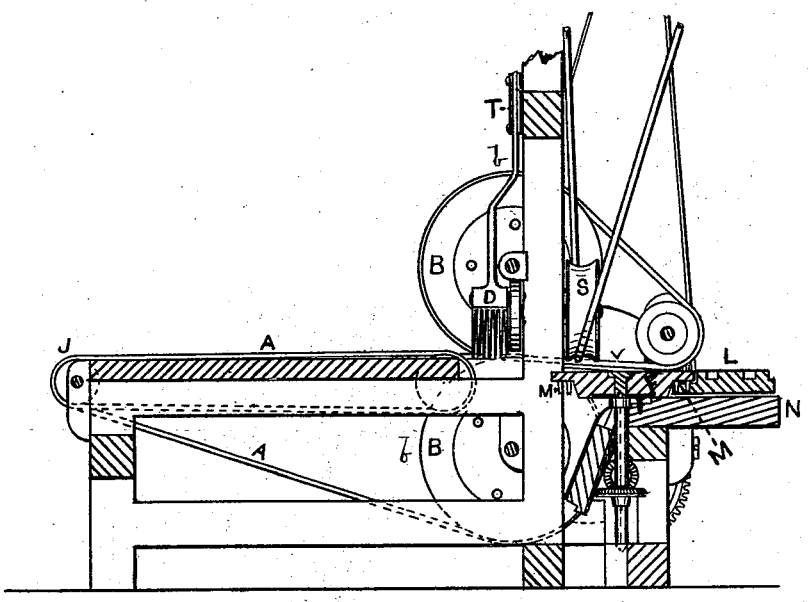

Figure 1 is a side elevation of the machine. Fig. 2 is a longitudinal vertical section on line $x$ $x$, Fig. 4. Fig. 3 is a rear elevation of the machine. Fig. 4 is a top view of the machine.

Similar letters of reference indicate corresponding parts in all of the figures.

G G and B B represent two sets of rotating friction disks or holders, arranged, in each set, one above the other, upon suitable shafts. Said holders run close enough together to form flat friction-surfaces, as hereinbefore described, and rotate in opposite directions, that the portion flattened and holding the stock may move in the same direction horizontally. The flexible surfaces of these holders are prevented collapsing by metallic flanges, as hereinafter described.

K K represent a series, two or more, of feeding or carrier belts running from the front of the machine to the friction-holders G G, one of which belts passes around the lower holder G, the other passing around a small pulley located just in front of and near to said holders. Both these belts K K pass around a pulley at the front or feeding-point of the machine. H represents a metallic comb pivoted loosely to a rotating disk. The comb has, at its upper part, a long arm, which is loosely pivoted to a horizontal arm, T, which latter changes the character of stroke of the comb from a circle to that of an ellipse, the long diameter being horizontal, thereby making a drawing stroke in passing through the stock. The comb H is suspended at the right hand of the holders G G, and is actuated by the pulley S, combing, mixing, and cleaning the stock carried slowly past it, (the comb H,) and projecting from the holders G G. The carrier-belts K K are placed so that in their width they are about equal to the length of the stock to be combed, which is about four inches (more or less) long.

The stock, cut to the desired length, is placed on the said carrier-belts K K crosswise, and carried by them to the first set of holders G G, between which holders the stock and one of the belts K only passes, the other belt, K, running over a pulley in front of the holders G G, as before mentioned, in consequence of which only that portion of the stock impinging upon one of the belts K passes between and is held by the holders G G, (the left-hand belt K running to the center of the holders, and the right-hand belt K running in a line somewhat to the right of the holders,) the other portion—about five-eighths—projecting from the holders G G, to be acted upon by the comb H.

After passing the comb H, the stock passes onto a polished plate or bridge, E′, being kept in motion by the stock behind it, and passing through the holders G G, and in place by the pressure-band V′, (this pressure-band V′ passes around the upper holder G, and around a small pulley over the plate E′,) which moves in the same direction that the stock does. The stock then passes to the endless reversing carrier-belt L, which is made in tapering sections, of wood or metal, which are secured to a flexible back. The wood or metal sections have a series of narrow grooves across them. These grooves continue entirely around the belt, allowing extensions or fingers on the outer edge of the plates E′ and E to lay in them, facilitating the passing on or off the belt L of the stock.

The belt L carries the stock from holders G G and plate E′ around to plate E and holders B B, in the movement turning the stock end for end. After passing from the belt L to plate E it is kept in motion and from breaking up by the pressure of the stock behind it, and the moving pressure-band V (similar to that over plate E′) above it. From the plate E the stock is passed to and between the second set of holders B B, which present the uncombed ends to the second comb (in all respects similar to comb H, and driven by similar mechanism) D, from whence it is passed to point J at front of the machine, by the delivering-belts A A, in the operation having passed entirely around the machine.

The flexible endless belt L moves over or around a lubricated semicircular table or race, N, the race having a rim at its outer edge to prevent the belt L from being forced from its position by the pins or hooks $m$ $m$ on the disk F.

It may be, in time, necessary to substitute anti-friction rollers in place of lubrication in the race-way N, but at this time it is not found to be necessary.

The disk F is rotated by a vertical shaft connected with the main shaft by means of a horizontal shaft and bevel-gears, so timed as to move the belt L at the same speed as the endless belts K K and A A move.

That portion of the belt L being between the plates E and E′ and toward the front of the machine, falls below the plane of the race N, to facilitate the delivering of the stock to plate E, and the receiving of stock from plate E′.

The disk F has at its outer edge a series of arms or hooks, $m$ $m$ $m$, which engage with a set of arms on the inner edge of the belt L as fast as it rises to the surface of the disk F at plate E′, and disengage from same at plate E as the stock is moved onto said plate E. The race N, being but half a circle, allows the belt L to fall below its surface between plates E and E′.

Power is applied to the lower pulley at the left hand of the machine, turning the upper part of the lower holder G from the feeder who stands at the front of the machine, the upper holder G turning in the opposite direction. Power is transmitted to the right-hand set of holders B B by a belt passing to an upper shaft, across the machine, thence by another belt down to shaft at right of machine, on which latter shaft is a gear meshing with another gear upon the shaft on which is placed the lower of the right holders B B. These latter holders run in a direction reverse to those on the left-hand side of the machine. Each holder of the sets G G and B B are fixed upon an independent shaft secured to the frame-work by suitable boxes. The combs H and D are driven by bands from pulleys on the shaft crossing the head of the machine, the combs making an elliptic stroke by means of the rotary disks, to which they are pivoted, and the action of the arms T T. The feeding-belts K K and delivery-belts A A are driven by being passed around the holders G and B (lower ones) and pulleys at the front and back end of the feeding-table. The pressure-belts V′ and V are driven by the upper of the holders G and B, and run close—that is to say, from one-eighth to three-fourths of an inch—to the plates E' and E, and over small pulleys back of the holders.

The frame to receive the above mechanism can be of wood or metal, and in form substantially as is shown.

What I claim as new, and desire to secure by Letters Patent, is—

1. The combination of the rotating holders G G and B B, bands A A and K K, and the endless transferring-belt L, with suitable means for operating the latter, all arranged and operating as and for the purpose set forth.

2. The combination of the rotating holders G G and B B, bands A A and K K, endless transferring-belt L, and combs H and D, all arranged and operating as and for the purpose set forth.

3. The feeding-belts K K, delivering-belts A A, holders G G and B B, combs H and D, plates E' and E, pressure-belts V' and V, transferring and reversing belt L, and raceway N, all combined, arranged, constructed, and operating as and for the purposes herein set forth.

4. In a machine for dressing tampico and bristles, the rotating friction bristle-holders B or G, with flexible or yielding faces or surfaces that gripe the bristles, substantially as and for the purposes described.

GEORGE WILLETT.

Witnesses:
EDWARD C. RYER,
RUSSELL S. TAFT.